3,180,966
SPARK EROSION MACHINE

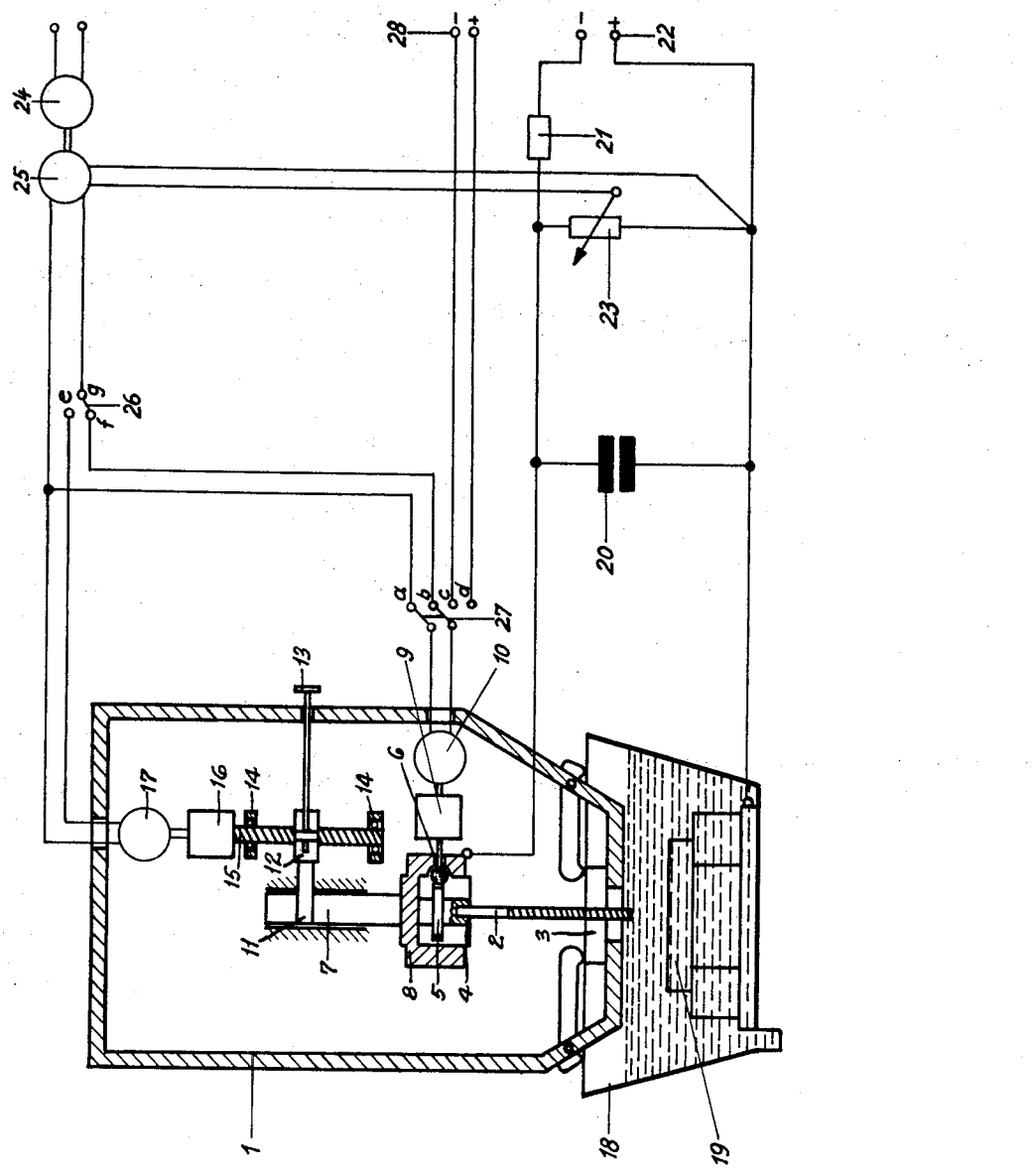

Fred K. Bender, Neu-Isenburg, near Frankfurt am Main, Germany, assignor to Nassovia Werkzeugmaschinenfabrik G.m.b.H., Langen, near Frankfurt am Main, Germany
Filed Mar. 5, 1963, Ser. No. 262,933
Claims priority, application Germany, Mar. 10, 1962, N 21,319
1 Claim. (Cl. 219—69)

This invention relates to a spark erosion machine for fabricating two or three dimension shaped pieces, such as a screw thread, and made of electrically conductive materials, and by using a non-rotating or twisting electrode connected to a vertically movable spindle.

In spark plug erosion work using electrically conductive materials; it is well known that electrical discharges are formed across the gap between the two electrodes, namely the workpiece and the tool electrode, and that these discharges have the effect of eroding the workpiece.

This electrical erosion usually takes place in a liquid dielectric, such as petroleum. The electrical discharge or spark created between the workpiece and tool electrode is accomplished by connecting both electrodes to an electrical energy source which, by means of an accumulator or condenser provides the necessary voltage to form the spark across the gap between the electrodes.

Ordinarily, in this process, a stiff tool electrode is fed vertically toward the workpiece being eroded by means of a servo motor. This motor is controlled so that it adjusts the tool electrode in accordance with the working condition changes at the workpiece in order to maintain a definite gap between the tool electrode and the workpiece. Two and three dimensional shapes can be created in this way and the electrode can be given an additional rotating movement in order to increase the accuracy of the movement of the tool electrode, especially in making cuts that have a circular cross-section.

Finally, it is conventional to give a twisting movement to the vertical and rotational movement of the tool electrode in order to form a corresponding screw threaded profile in the workpiece while using a spindle tool electrode. Methods that deviate from the basic method of using a non-rotating electrode with a vertical feed to obtain additional movements of the tool electrode are too expensive and time consuming when used with the basic spark erosion machine because such additional movements are obtained by using accessories attached to the spindle head of the machine. For example, it is known to exchange a spindle head having a non-rotating tool electrode for a spindle head having a tool electrode spindle with a rotary drive whenever the shape being cut in the workpiece requires the same. Such an exchange requires an undesirable loss of time. The same holds true for changes which must be made at the machine itself, for example, if a threaded shape is to be cut by erosion as soon as the operation requiring the non-rotating and/or rotating tool electrode is finished, and which further requires a twisting forward feeding at a certain angle of the correspondingly shaped electrode. In this latter case, there must be additionally installed a tool electrode spindle drive, including a gear change in order to obtain the desired screw pitch. This also is very laborious and requires a considerable number of additional parts.

The object of this invention is to produce a much simpler and more economical spark plug erosion machine and method by accomplishing the change over between all possible and individual working methods by means of a few manipulations, as by actuating a lever, switch or the like, and without taking down and re-assembling the machine in order to avoid a costly time loss. In this invention, the object is accomplished by the combination of the following conventional features A, B, C, together with the additional feature D:

(A) A first driving means servo controlled from the change of the working conditions at the spark gap is used for vertically feeding the spindle holding the non-rotating tool electrode;

(B) A second driving means is used for rotating the spindle holding said tool electrode;

(C) A screw threaded twisting tool electrode is used which is given a twisting motion by means of a correspondingly threaded guide block and is driven by servo controlled means in accordance with the changes in the working conditions at the spark gap; and (D) All the drives of A, B, and C for the tool electrode are mounted in a common housing which forms the working head, and are electrically operated so that the driving movement of the spindle holding the non-rotating tool electrode lies in the control circuit for the servo control for the feed of the electrode, and the drive for the rotating and/or twisting feed of the tool electrode can, as a matter of choice, be connected to a normal source of direct current for the rotating movement, or connected parallel to this electric circuit for the twisting feed, while at the time this latter is switched on the other drive is simultaneously switched off.

In this combination, it is advantageous to form the drive for the vertical feeding movement of the non-rotating tool electrode as a servo motor having a reduction gear and connected to a threaded shaft by a split nut which, in turn, is joined to the vertically movable tool electrode spindle.

The other drive for the rotating and twisting feeding movement of the tool electrode is composed of a second servo motor provided with a reduction gear which, in turn, drives a worm gear fastened to the lower end of the tool electrode spindle and mounted in a separate housing so that the worm gear rotates the tool electrode.

Both servo motors are selectively actuated by being connected into the electric circuit responsive to the working condition changes at the spark gap, and by means of suitable switching means the servo motor for driving the twisting of the tool electrode is connectable to a source of direct current so as to operate as a simple drive motor for rotating the tool electrode independently of the spark gap control circuit. The especial overall advantage of the combination of this invention lies on the one hand that all the driving elements for the feeding movement of the electrode with the non-rotating, the rotating, and the twisting movement are installed in the machine working head, while on the other hand, only a few, and at most, three manipulations are necessary in order to change over from one operation, such as the eroding of a passageway hole with the rotating electrode, to another operation, such as the erosion of threads by means of a twisting electrode.

The means by which the objects of the invention are obtained are described more fully with reference to the accompanying schematic drawing.

The working head is composed of a housing 1 in which is mounted the threaded tool electrode 2, the lower end of which extends to a guide block 3 fixed to the housing. The upper end of electrode 2 is seated in a chuck 4 to which is fixed a ring gear 5 driven by worm gear 6. Chuck 4 is located in the lower end of spindle 7 and contained in a separate housing 8 fastened to the spindle. Worm gear 6 is driven by means of a flexible shaft extending to a reduction gear 9 which, in turn, is driven by motor 10.

A bracket 11 is secured to the upper end of spindle 7 and extends to a split nut 12 used as a clutch and opened and closed by a handle 13. Journalled in bearing supports 14 is a threaded shaft 15 to which split nut 12 is threaded. Shaft 15 is rotated by a reduction gear 16 driven by servo motor 17. Housing 1 constituting the working head of the spark erosion machine is carried by, not shown, supports and provided with the usual means for adjusting its height relative to the workpiece. The same holds true for the basin 18 containing the liquid dielectric and the workpiece 19. The conventional undercarriage supporting the basin is not shown.

The electrical circuit between the tool electrode 2 and the workpiece 19 includes a condenser 20 and a loading impedance 21 joined to a direct current source 22. The gap between the electrode 2 and the workpiece 19 is regulated according to working conditions by means of an eletcrical control circuit including a potentiometer 23. A motor 24 drives a generator 25 coupled to potentiometer 23. Generator 25 is connectable to motors 10 and 17 through switches 27 and 26, respectively. Potentiometer 23 senses changes in the voltage produced by the change in the gap between the electrodes, which changes are amplified by generator 25 and directed to one of the motors 10 or 17. These motors are selectively switched on and off in the electric circuit control by means of switches 26 and 27. However, switch 27 cannot only disconnect servo motor 10 from the electric circuit control, but can also connect motor 10 to an independent source of direct current 28, or can entirely disconnect and stop motor 10.

In operation, the machine is assumed to be first used for the ordinary electrical erosion method in which the tool electrode 2 is non-rotating and moved toward the workpiece 19. In this case, electrode 2 does not need to be threaded and consequently the guide block 3 is not used. Three-way switch 27 can be set in its upper position with contacts *a* and *b* closed, or in its middle position with contacts *b* and *c* closed, and in switch 26 contacts *e* and *g* are closed. Split nut 12 is also tightened.

Thus servo motor 17 is energized to rotate threaded shaft 15 which, through bracket 11, moves spindle 7 downwardly. If, during the spark erosion process, the tool electrode is to execute an additional rotating movement, the switch 27 is moved to its lower position with contacts *c* and *d* closed, thus activating servo motor 10 from the direct current source 28, and rotates electrode 2 without being influenced by the gap control circuit responsive to potentiometer 23.

When a threaded profile is to be spark eroded in the workpiece 19, the first step is to replace a plain surfaced electrode 2 with one that is threaded, and the corresponding guide block 3 is mounted in the bottom of housing 1. The split nut 12 is loosened by means of handle 13, and switch 26 is set to close contacts *f* and *g* in order to disconnect motor 17. Switch 27 is set to close upper contacts *a* and *b*. Servo motor 17 is cut out and servo motor 10 is connected to the electrical gap control circuit, and thus motor 10 rotates the tool electrode 2 under the influence of potentiometer 23.

Having now described the means by which the objects of the invention are obtained, I claim:

A spark erosion machine for the fabrication of two and three dimensional shapes in electrically conductive materials including threaded pieces by means of a non-rotating or by a rotating and twisting tool electrode comprising in combination:

(A) first servo motor driving means including a servo motor, a reduction gear joined to said motor, a rotatable threaded shaft driven by said gear, a split nut threaded on said shaft and forming the only clutch in said machine, a spindle holding said electrode, and a bracket secured to said spindle and said nut for adjusting the vertical feed of said electrode while non-rotating in response to working condition changes at the spark gap;

(B) second servo motor driving means for rotating said electrode;

(C) guide block means for said electrode when threaded, and adjusting means for said second driving means responsive to changing working conditions at the spark gap; and (D) a common housing for said electrode, first and second driving means and forming the machine working head, and electric circuit means joined to said first and second driving means for energizing said first driving means and for alternatively joining said second drive means to a direct current source for rotating only said electrode or for joining said second drive means in parallel with the spark gap circuit for activating said second drive means in conjunction with C, supra.

References Cited by the Examiner

UNITED STATES PATENTS

| 1,195,145 | 8/16 | Mattingly | 219—69 X |
| 2,650,979 | 9/53 | Teubner | 219—69 |
| 2,773,968 | 12/56 | Martellotti | 219—69 |

RICHARD M. WOOD, *Primary Examiner.*

MAX L. LEVY, *Examiner.*